NEGATIVE RESISTANCE MAGNETORESISTIVE DEVICE

Filed June 28, 1967 2 Sheets-Sheet 1

INVENTOR.
MILTON GREEN
BY Stephen P. Fox
AGENT

NEGATIVE RESISTANCE MAGNETORESISTIVE DEVICE

Filed June 28, 1967

INVENTOR.
MILTON GREEN 3,518,459

NEGATIVE RESISTANCE MAGNETORESISTIVE DEVICE

Milton Green, Mystic, Conn., assignor to Burroughs Corporation, Detroit, Mich., a corporation of Michigan Filed June 28, 1967, Ser. No. 650,129
Int. Cl. H03k *3/00*
U.S. Cl. 307—309 9 Claims

ABSTRACT OF THE DISCLOSURE

A device including a magnetoresistive semiconductor for producing a variable negative resistance region at non-cryogenic operating temperatures. The negative resistance region generated is variable as a function of a controlled two component magnetic field applied to the semiconductor. Operation of the device depends on the proper mathematical relationships between various circuit parameters.

BACKGROUND OF THE INVENTION

This invention relates to a magnetoresistive device, and more specifically to a semiconductor magnetoresistive device having negative resistance characteristics.

Negative resistance devices, per se, are well known in the art and may be generally defined as having a characteristic of negative resistance which occurs at an intermediate range of potential between adjacent positive resistance characteristic regions at higher and lower levels of potential. Tunnel diodes are one of the better known examples of devices of this type. Generally, negative resistance devices have had only one negative resistance region which was not variable. Many circuits such as amplifiers, oscillators, or bistable circuits have utilized negative resistance devices of one type or another. The desirability of being able to vary the operating characteristics of a single negative resistance device will be appreciated by those skilled in the art.

It is now well known in the art that at very low temperatures, certain types of semiconductors exhibit negative resistance characteristics. Generally, the negative resistance characteristic occurs in a transition region caused by a sudden decrease, or "breakdown," in resistivity from a high to a low value at the critical voltage of the semiconductor. This phenomenon can be explained by considering that when the potential applied to the semiconductor is less than its critical voltage, the electric charge carriers present in the semiconductor are relatively immobile, and therefore resistivity is high. As the applied potential is increased, the electric charge carriers become increasingly mobile, and, at the critical voltage, they possess sufficient energy to ionize the semiconductor atoms on impact. The conductive plasma thus formed causes the resistivity to drop suddenly to a low value.

A semiconductor of the type described above is known to be highly sensitive to the presence of a magnetic field. The effect of a magnetic field is to deflect the plasma so as to greatly increase resistivity after "breakdown." Thus, the negative resistance characteristic in the high-to low resistivity transition region can be made somewhat variable as a function of the applied magnetic field. This phenomenon has been observed in prior art devices in which a semiconductor such as indium antimonide is subjected to low temperatures in the range of 77° K. and placed in the air gap of a toroidal core. Generally, two independent windings are provided on the core. One of the windings is used to establish a magnetic field bias, and the other winding is connected to an A.C. input signal to modulate the magnetic field intensity, which in turn modulates current flowing through the semiconductor. Thus, devices of this type can be useful as amplifiers.

It is important to note that devices of the type described above have serious limitations and inherent disadvantages. Specifically, the semiconductors must be operated in the range of their critical voltages and at cryogenic temperatures. The operation of equipment in the temperature ranges of liquid helium and liquid nitrogen gives rise to many problems such as leakage of the coolant as well as special and costly refrigeration equipment.

OBJECTIVES AND SUMMARY OF THE INVENTION

It is an object of this invention to provide a device having a negative resistance characteristic that is easily variable.

It is a further object of this invention to provide a variable negative resistance device which is operable outside super-cooled temperature zones.

It is an additional object of this invention to provide a variable negative resistance device utilizing a magnetically sensitive semiconductor operable outside the range of its critical voltage.

In accordance with the foregoing objectives, applicant's invention comprises a magnetoresistor and means for applying a two component magnetic field thereto. One of the magnetic field components acts as a bias. The other field component acts oppositely to the bias component and varies with the current flow through the magnetoresistor, so that the net magnetic field applied thereto is an inverse function of the current therethrough. The magnetoresistor operates at non-cryogenic temperatures at which it has a predetermined magnetic sensitivity, but does not have an inherent negative resistance characteristic. However, in applicant's novel circuit configuration, the magnetoresistor has a negative resistance region which can be varied by adjusting the applied magnetic field bias component.

Further objects and advantages will become apparent or will be specifically pointed out in the following specification when taken with the accompanying drawings.

DESCRIPTION OF THE PREFERRED EMBODIMENT

Figure 1:
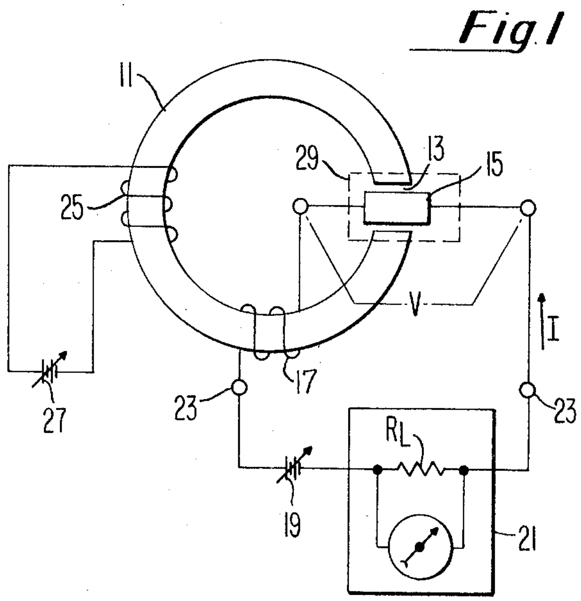
FIG. 1 is a schematic diagram of one embodiment of applicant's invention.

As shown in FIG. 1, a core 11, having a transducing gap 13 therein, has a magnetoresistor 15 operatively placed in said gap. The transducing gap 13 may be an air gap, or it may be filled with some other material. A field winding 17 is inductively coupled to the core 11. The winding 17 forms a series circuit with said magnetoresistor 15 and also with the combination of a source of variable potential 19 and a utilization device 21 connected at the two terminals 23. The utilization device may be a detector such as the voltmeter and load resistor $R_L$ as shown, or it may be some other means for faciliating connection to additional circuitry, an example of which will be described hereinafter. A bias winding 25 having a source of variable potential 27 is also inductively coupled to said core 11. Cooling means, illustrated in FIG. 1 by the dotted outline 29, may be provided to lower the temperature of the magnetoresistor and the core.

It is to be noted that the embodiment described above is merely exemplary and that other circuit configurations may be used. Specifically, the magnetic core 11 may be replaced with a solenoid or other pole pieces having a magnetic transducing gap in which the magnetoresistor may be placed. Also, modifications may be made in the arrangement of the driving potential and utilization circuitry, with attendant changes in input and output connections, provided that a certain relationship is maintained between the magnetoresistor current and the applied magnetic field, as will be hereinafter described.

Figure 2:
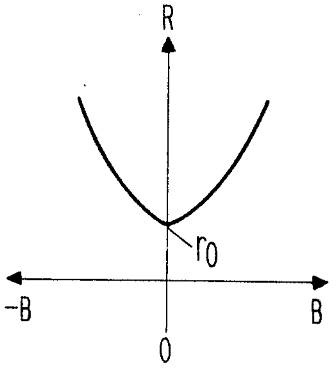
FIG. 2 is a graph showing the resistance characteristics of a magnetoresistor in a magnetic field.

The resistance of the magnetoresistor is preferably a quadratic function of the applied magnetic field, as illustrated in FIG. 2. As shown, the resistance R of the magnetoresistor increases with an increase, either positive or negative, in the magnetic field B. When no magnetic field is present, the resistance of the magnetoresistor is a minimum value $r_0$ which is dependent on its internal composition and inherent characteristics. A further discussion of magnetoresistors and their operating characteristics may be found in an article entitled "The Gaussistor, a Solid State Electronic Valve," by Milton Green, published in the IRE Transactions of the Professional Group on Electron Devices, vol. ED—3, No. 3, July 1956.

It has been found that the relationship between the resistance and the applied magnetic field as shown in FIG. 2 is obtained when a magnetoresistor such as indium antimonide is placed in a magnetic field and cooled to approximately the temperature of Dry Ice (carbon dioxide at 194 degrees K.).

Figure 3:
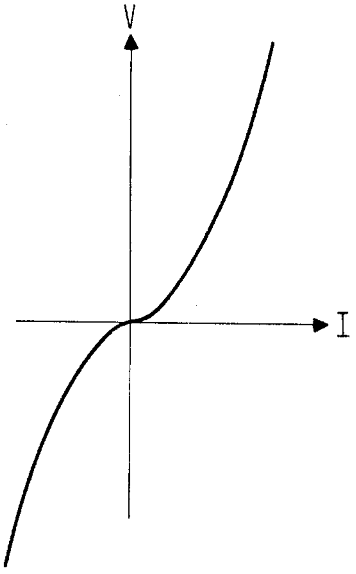
FIG. 3 is a graph illustrating the voltage-current characteristics of a magnetoresistor.

A magnetoresistor may be placed in the air gap of a magnetic core material, such as silicon steel or one of the well known ferrites, and connected in series with a field winding on the core and a source of variable potential. The circuit configuration in this case is similar to that shown in FIG. 1, with the important exception that there is no bias winding and therefore no bias field. The resulting relationship between the voltage across and current through the magnetoresistor is shown in FIG. 3. It is apparent from this graph that throughout the operating range of the device, the slope of the curve, and thus the resistance, is always a positive value.

Figure 4:
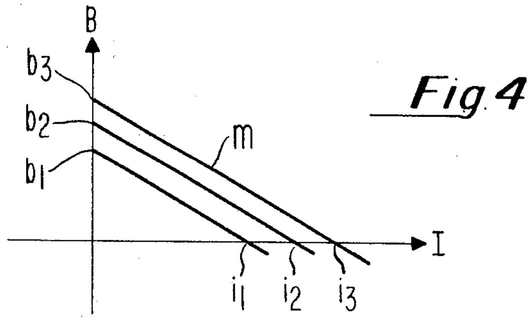
FIG. 4 is a graph showing the relationship between the magnetic field applied to a magnetoresistor and the current flowing through it in the circuit configuration of FIG. 1.

Considering now the circuit arrangement of FIG. 1, the field winding 17 and the bias winding 25 each produce a magnetomotive force in the air gap 13. The two windings 17 and 25 and their respective variable potential sources 19 and 27 are connected so that the magnetomotive forces generated by each winding are in bucking relation in the air gap 13. FIG. 4 shows the relationship between the net magnetic field B in the air gap and the current I in the series circuit of magnetoresistor 15, field winding 17, and potential source 19. As illustrated, the relationship is substantially linear, with a negative slope $m$ dependent on the physical characteristics of the windings and the core. From the graph, it is apparent that with no current flow through the field winding 17, the magnetic field in the air gap will be one of the values $b_1, b_2, b_3 \ldots$, depending on the potential applied to the bias winding. Also, it is evident that at magnetoresistor current values $i_1, i_2, i_3 \ldots$ corresponding respectively to the aforenamed bias field values, the net magnetic field in the air gap will be zero.

Figure 5:
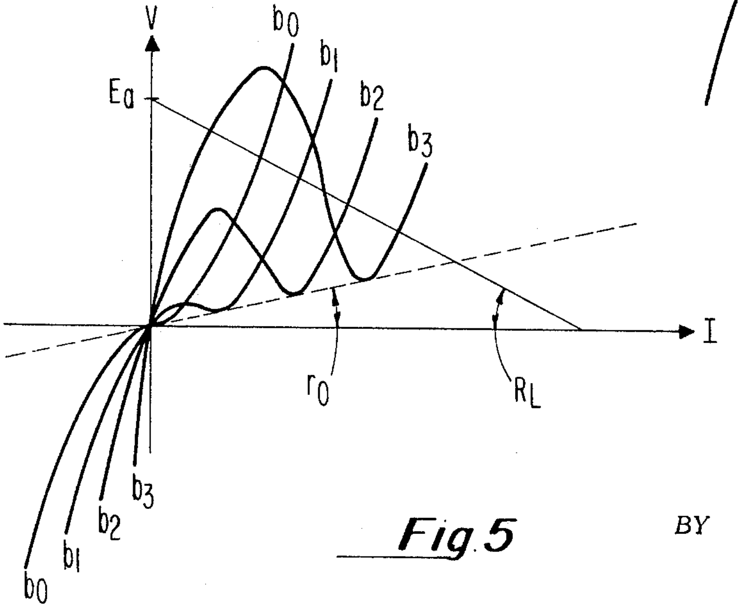
FIG. 5 is a graph illustrating representative ones of the family of negative resistance characteristic curves produced by the circuit configuration of FIG. 1.

FIG. 5 illustrates the relationship between the voltage across and current through the magnetoresistor 15 for different predetermined values of magnetic field biasing in the core air gap 13. As shown, a negative resistance characteristic is developed as the magnitude of the biasing field is increased. For example, with a small or zero biasing field $b_0$, no negative resistance region is produced and the characteristic curve is substantially as shown in FIG. 3, whereas with a larger biasing field $b_3$, a substantial negative resistance region is generated. The minimum or valley points of the family of characteristic curves occur along a dashed line, the slope of which corresponds to the minimum resistance $r_0$ of the magnetoresistor when the net applied magnetic field is zero, as shown in FIG. 2. One of the main features of applicant's invention is that the particular shapes of the characteristic curves, and thus the negative resistance regions, can be varied by merely adjusting the potential applied to the bias winding.

The configuration of applicant's invention shown in FIG. 1 may be used as an amplifier circuit. The input signal may be, for example, the variable potential source 27 or some other signal source substituted therefor. Variations in the input signal will determine the current through biasing winding 25 which in turn will control the magnetic biasing field in the transducing gap 13. The output may be taken across the load resistor $R_L$, with the potential source 19 in series therewith set at a fixed value $E_a$.

Operation of the amplifier may be understood by reference to FIG. 5, which illustrates a load line passing through the value $E_a$ on the voltage axis and having a slope corresponding to the load resistance $R_L$. Small variations in the input signal will shift the biasing field $b$ so that the output voltage will follow the load line on the stable high sides of the characteristic curves, i.e. the portion of each curve to the right of the valley point. Operation on the high sides of these curves is insured by first stabilizing the voltage and current in the output circuit and then producing the magnetic biasing field by applying the input signal. The gain of the amplifier, as measured in terms of the change in the current I through the load resistor $R_L$ for a given change in the input signal, has been found to be maximum when the net magnetic field in the transducing gap 13 is near zero.

Figures 6A, 6B, 7A, 7B:
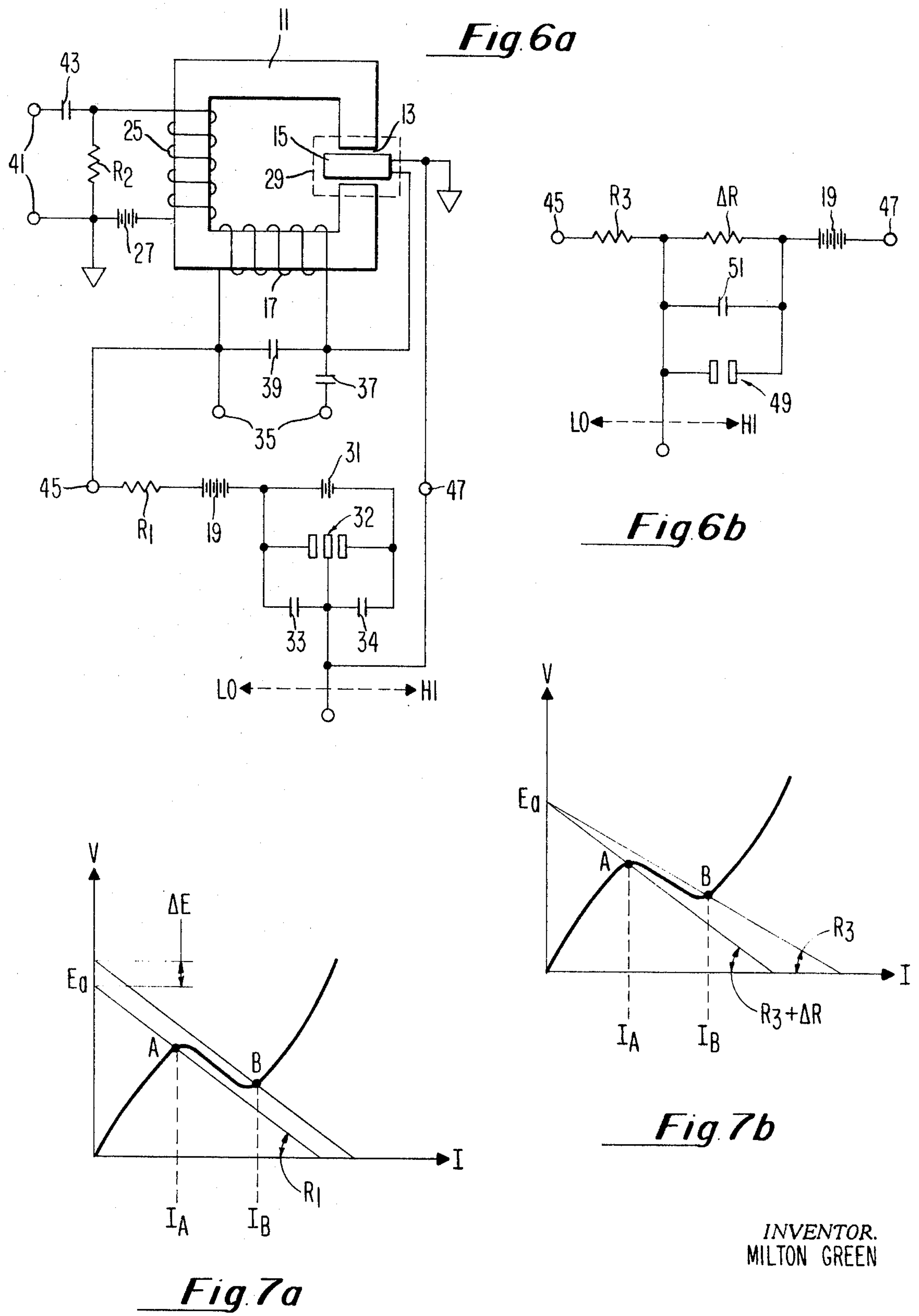
FIG. 6*a* is a schematic diagram of a bistable circuit employing applicant's invention.
FIG. 6*b* is a schematic diagram of a circuit modification for the bistable circuit of FIG. 6*a*.
FIGS. 7*a, b* are graphs illustrating the operating characteristics for the circuits of FIGS. 6*a, b*.

An example of one type of bistable circuit utilizing applicant's inventive concept is illustrated in FIG. 6*a*. The circuit configuration is similar to that shown in FIG. 1, with the addition of another potential source 31 and switching means 32 in the series current path comprising magnetoresistor 15, field winding 17 a load resistor $R_1$, and potential source 19. The switching means 32 includes a single pole double throw switch having left and right stationary contacts and a movable center contact which is illustrated in an intermediate off position. The left and right contacts are connected respectively to the oppositely poled terminals of the potential source 31, with the left contact also being connected to the potential source 19. The center contact is coupled to one of the magnetoresistor terminals. When the center contact of the switch 32 is moved to the left, only the potential source 19 is coupled into the series current path, whereas when the center contact is moved to the right, both potential sources 19 and 31 are coupled into the current path.

Arc suppression capacitors 33 and 34 are connected between the center contact and the left and right contacts respectively. A pair of output terminals 35 is connected across the field winding 17, one of said output terminals being coupled through a blocking capacitor 37. A capacitor 39 is connected across the field winding 17 to eliminate undesirable transient phenomena during dynamic operation of the circuit.

Another series current path includes the bias winding 25, the source of bias potential 27, and a resistor $R_2$. A pair of output terminals 41 is connected across the resistor $R_2$ through a blocking capacitor 43.

For a given magnetic field bias produced by the winding 25, and a given magnetoresistor 15, the negative resistance characteristic produced by the circuit of FIG. *6a* will be as shown in the graph of FIG. *7a*, wherein the V and I axes represent the voltage across and current through the magnetoresistor 15. The circuit may be operated at either of two stable states corresponding to the currents $I_A$ and $I_B$ through the magnetoresistor. Switching from one stable state to the other may be achieved by switching the potential source 31 into or out of the circuit, which in turn shifts the load line established by resistor $R_1$. More specifically, when the voltage of potential source 19 is set at the value $E_a$ and the switch 32 is moved to the left or "LO" position, the load line of resistor $R_1$ will pass through $E_a$ on the V axis and will intersect the characteristic curve at stable point A. This will be the only point of intersection if the value of resistor $R_1$ is set equal to $-(dV/dI)$ corresponding to the negative value of the slope of the linear portion of the negative resistance region which occurs between a certain lower current level at the peak point and an upper current level at the valley point in the characteristic curve. Assuming that the potential source 31 produces an incremental voltage $\Delta E$ which is relatively small compared to the voltage $E_a$, the movement of the center contact of switch 32 to the right or "HI" position will shift the load line so that it intersects the characteristic curve at stable point B. It can be seen from FIG. *7a* that with properly chosen values of the resistor $R_1$ and the potential source 19, a small change at the circuit input, i.e. an incremental voltage shift $\Delta E$, will cause the bistable circuit to switch from one steady state operating condition to another.

The output of the bistable circuit may be taken at either of the two pairs of terminals 35 or 41. Output pulses will have a shape dependent on the circuit inductance, capacitance and resistance and will occur during dynamic operation of the switching means 32.

An alternative form of the switched-input bistable circuit described hereinabove is shown in the circuit of FIG. *6b*, which replaces the elements between terminals 45 and 47 in FIG. *6a*. Resistor $R_3$, incremental resistor $\Delta R$ and potential source 19 are connected in series between the terminals 45 and 47. Also connected between terminals 45 and 47 is a single pole single throw switch 49 having left and right contacts connected respectively to opposite ends of resistor $\Delta R$. An arc suppression capacitor 51 is connected across the contacts. The value of resistor $\Delta R$ is small compared to resistor $R_3$, the latter being chosen approximately equal to but slightly displaced in value from $-(dV/dI)$ for magnetoresistor voltage and current in the linear portion of the negative resistance region of the characteristic curve, as hereinabove described with reference to FIG. *6a* and FIG. *7a*.

The operation of the combined circuitry of FIG. *6a* and FIG. *6b* may be understood by reference to FIG. *7b*, which illustrates the characteristic curve of the circuit for the same predetermined values of magnetoresistor current and voltage as in FIG. *7a*. There are two load lines shown in FIG. *7b*, both of which intersect the V axis at the value $E_a$, which is the voltage of the potential source 19. The load line intersecting the curve at point A and having a slope equal to $-(R_3+\Delta R)$ corresponds to the circuit operation when switch 49 is in the "LO" current position with its contacts open so that the sum of resistors $R_3$ and $\Delta R$ form the load resistance. The load line intersecting the curve at point B and having a slope of $R_3$ corresponds to the circuit when switch 49 is in the "HI" current position with its contacts closed so that the resistor $\Delta R$ is shunted and only resistor $R_3$ constitutes the load resistance. Thus, a change in the load resistance by the incremental value $\Delta R$ will shift circuit operation between the stable state at low current $I_A$ and the stable state at high current $I_B$.

As described hereinabove, operation of the bistable circuit may be achieved either by voltage switching, as shown in FIG. *6a*, or by resistance switching, as shown in FIG. *6b*. Only mechanical manual operation of the switches has been described herein; however, it will be obvious to one skilled in the art that switching may be accomplished by other means, such as by electromagnetic relays or electronic circuitry. For example, the switching means may comprise a portion of some other driving circuitry responsive to predetermined logic conditions. Also it is to be noted that the outputs of the bistable circuit are not limited to the two pairs of terminals 35 and 41 connected through respective blocking capacitors 37 and 43. Other output configurations, either A.C. or D.C. coupled to the circuit, may be utilized.

As pointed out in the foregoing description, the magnetoresistor in the magnetic core air gap will operate at the temperature of carbon dioxide at approximately 194° K., which is commonly known as Dry Ice. However, the scope of the present invention is not to be limited to operation in this temperature zone. Nor is the magnetoresistor necessarily composed of indium antimonide. It is conceivable that other materials may be used for the magnetoresistor and that operation may be achieved at temperatures higher than 194° K., such as room temperatures or even higher. As will become apparent in the following description, an important parameter is the magnetic sensitivity of the magnetoresistor. The relationship between the resistance of the magnetoresistor and the magnetic field applied thereto preferably should be as shown in FIG. 2.

It will be helpful to consider the development of mathematical expressions to explain the operation of applicant's invention. Referring first to FIG. 2, it can be seen that the resistance of the magnetoresistor is approximately a quadratic function of the applied magnetic field. The relationship for the magnetic sensitivity may be expressed as follows:

$$R=kB^2+r_0 \qquad (1)$$

where R is the resistance of the magnetoresistor, B is the magnetic field applied thereto, and $k$ and $r_0$ are constants, which depend on the physical characteristics of the magnetoresistive material.

A magnetoresistor in the circuit configuration of FIG. 1 operates in the presence of a net magnetic field that is approximately a linear inverse function of the current flowing through the magnetoresistor. This relationship, which is linear as long as the core 11 does not saturate, is shown in FIG. 4, and the expression for the net magnetic field B in the core air gap is as follows:

$$B=mI+b \qquad (2)$$

where I is the current flowing through the magnetoresistor and $m$ and $b$ are constants. The slope $m$ is negative and depends on the physical characteristics of the magnetic core and the windings thereon. The constant $b$ is the magnetic field bias component and may be any one of the several values $b_1$, $b_2$, $b_3$ . . . , depending on the energization of the biasing winding.

By substituting the expression for the net magnetic field, as in Equation 2, into Equation 1, and taking account of Ohm's law, the following equation is derived:

$$R=\frac{V}{I}=k(mI+b)^2+r_0 \qquad (3)$$

where V is the voltage across the magnetoresistor and I is the current through it.

When Equation 3 is expanded, the following expression for the voltage V in terms of the current I results:

$$V=km^2I^3+2kmbI^2+(kb^2+r_0)I \qquad (4)$$

Equation 4 is the mathematical expression for the family of characteristic curves shown in FIG. 5. As can be seen, the voltage V is a third-order, or cubic, function of the current I. The coefficient $2kmb$ of the $I^2$ term is negative because the slope $m$ is negative, as shown in FIG. 4. Therefore this equation will plot with a negative resistance region, provided the constants have the proper values.

The slope of any one of the family of curves shown in FIG. 5 varies as a function of the current I and may be found by differentiating Equation 4. Accordingly, the derivative of the voltage V with respect to the current I is as follows:

$$\frac{dV}{dI}=3km^2I^2+4kmbI+(kb^2+r_0) \quad (5)$$

A negative resistance will be exhibited in the region between two values of the current I corresponding respectively to maximum and minimum values of voltage V at which $dV/dI$ is zero. These values of the current may be found by setting the right-hand side of Equation 5 equal to zero and solving for I by using the well known quadratic formula. The resulting expression for the current I in terms of the above-defined circuit constants is as follows:

$$I=\frac{-4kmb\pm\sqrt{(4kmb)^2-4(3km^2)(kb^2+r_0)}}{2(3km^2)} \quad (6)$$

Equation 6 will yield two distinct values of the current I when the relationship between the circuit constants in the expression inside the square root sign is a positive value, as indicated below:

$$(4kmb)^2-4(3km^2)(kb^2+r_0)>0 \quad (7)$$

After expanding Equation 7 and simplifying the terms thereof, the following result is obtained:

$$kb^2-3r_0>0 \quad (8)$$

Thus, whenever Equation 8 is satisfied, the circuit of FIG. 1 will generate a negative resistance region between particular low and high values of the current I. It can be seen that the controlling parameters are the magnetic field bias component $b$, and the constants $k$ and $r_0$ which describe the magnetic sensitivity of the magnetoresistor. For a given magnetoresistor device characterized by the consatnts $k$ and $r_0$, the following expression may be derived from Equation 8 for the required bias field $b$ to produce a negative resistance region:

$$b>\sqrt{\frac{3r_0}{k}} \quad (9)$$

The formulations presented hereinabove are based on mathematical approximations for the physical characteristics of the magnetoresistive material (Equation 1) and for the magnetic field developed in the core air gap (Equation 2). Thus, Equation 4 derived above may represent only an approximation of the family of characteristic curves illustrated in FIG. 5. Also, Equation 9 may yield only an approximate value of the minimum required bias field for a given magnetoresistor. Nevertheless, it is apparent to one skilled in the art that these equations may be used in developing any desired negative resistance characteristic provided that the magnetoresistor used has a magnetic sensitivity similar to that shown in FIG. 2.

While in the specification only one embodiment of applicant's invention has been described, it should be noted that the scope of this invention includes various changes and modifications that are within the skill of those familiar with the art.

I claim:

1. A magnetoresistive apparatus having a variable negative resistance characteristic, including a magnetic core having a transducing gap comprising:
- a semiconductor magnetoresistor having a current path therethrough and being positioned in said gap,
- first means for applying a magnetic field bias to said magnetoresistor including a bias winding inductively coupled to said core,
- second means for applying a variable magnetic field to said magnetoresistor in bucking relationship with said bias field including a field winding inductively coupled to said core, and

- means interconnecting said second variable magnetic field means and said magnetoresistor for varying the magnitude of said variable field in proportion to the magnitude of current flowing through said magnetoresistor including a source of driving potential connected in a series current path with said field winding and said magnetoresistor.

2. The apparatus of claim 1 forming an amplifier including,
- means coupled to said bias winding for receiving an input signal to control said bias field,
- load resistance means connected in said series current path with said source of driving potential, said field winding and said magnetoresistor, and
- output terminal means connected across said load resistor means.

3. The apparatus of claim 1 forming a bistable device having two stable states corresponding to first and second current levels, said bistable device including,
- a load resistance connected in said series current path,
- input condition responsive switching means coupled to said series current path for selectively changing the voltage of said driving potential by a predetermined increment to shift said magnetoresistor into one or the other of said first and second stable current levels, and
- output terminal means for indicating the state of said magnetoresistor.

4. The bistable device of claim 3,
- said magnetoresistor being characterized by a voltage-current relationship having a negative resistance region bounded by high and low current levels, said negative resistance region having a linear portion with a predetermined slope,
- said load resistance being equal to the negative value of said slope,
- said source of driving potential having a predetermined voltage level output for operating said magnetoresistor at said first stable current level less than said low current level, and
- said predetermined voltage increment having a value for switching said magnetoresistor to said second stable current level greater than said high current level.

5. The apparatus of claim 1 forming a bistable device having first and second stable current states, said bistable device including,
- a load resistance connected in said series current path,
- input condition responsive switching means coupled to said series current path for selectively changing said load resistance by a predetermined increment to shift said magnetoresistor into one or the other of said first and second stable current states, and
- output terminal means for indicating the state of said magnetoresistor.

6. The bistable device of claim 5,
- said magnetoresistor being characterized by a voltage-current relationship having a negative resistance region bounded by high and low current levels, said negative resistance region having a linear portion with a predetermined slope,
- said load resistance being approximately equal to the negative value of said slope,
- said source of driving potential having a predetermined voltage level output for operating said magnetoresistor at said first stable state corresponding to a current level greater than said high current level, and
- said predetermined resistance increment having a value for switching said magnetoresistor to a second stable state corresponding to a current level less than said low current level.

7. A device having a controllable negative resistance characteristic comprising
- a semiconductor magnetoresistor having a current path therethrough, said magnetoresistor being characterized by a magnetic sensitivity wherein the resistance of said magnetoresistor is substantially a function of the square of a magnetic field applied thereto, means responsive to the magnitude of current flow through said magnetoresistor for generating a variable magnetic field in the presence of said magnetoresistor, said generated magnetic field having a predetermined bias component and being variable in substantially linear inverse proportion to said current flow.

8. The apparatus of claim 7, wherein said magnetoresistor has a resistance R expressed by the mathematical equation $$R=kB^2+r_0$$

where $k$ and $r_0$ are constants dependent on the physical characteristics of said magnetoresistor and B is the magnetic field applied thereto, and said generating means produces a magnetic field B expressed by the mathematical equation $$B=mI+b$$

where $m$ is a negative constant dependent on the physical characteristics of said generating means, $b$ is said predetermined magnetic field bias component, and I is said current flow through said magnetoresistor.

9. The apparatus of claim 8 wherein said magnetic field bias component $b$ has a value greater than the mathematical expression:

$$\sqrt{\frac{3r_0}{k}}$$

References Cited

UNITED STATES PATENTS 3,167,663 1/1965 Melngailis et al. ----- 317—235

DONALD D. FORRER, Primary Examiner

B. P. DAVIS, Assistant Examiner

U.S. Cl. X.R.

307—278, 324; 324—47